April 17, 1928.
W. HARTLEY
1,666,379
WASTE COLLECTING DEVICE FOR COMBING AND LIKE MACHINES
Filed Jan. 22, 1926
2 Sheets-Sheet 1
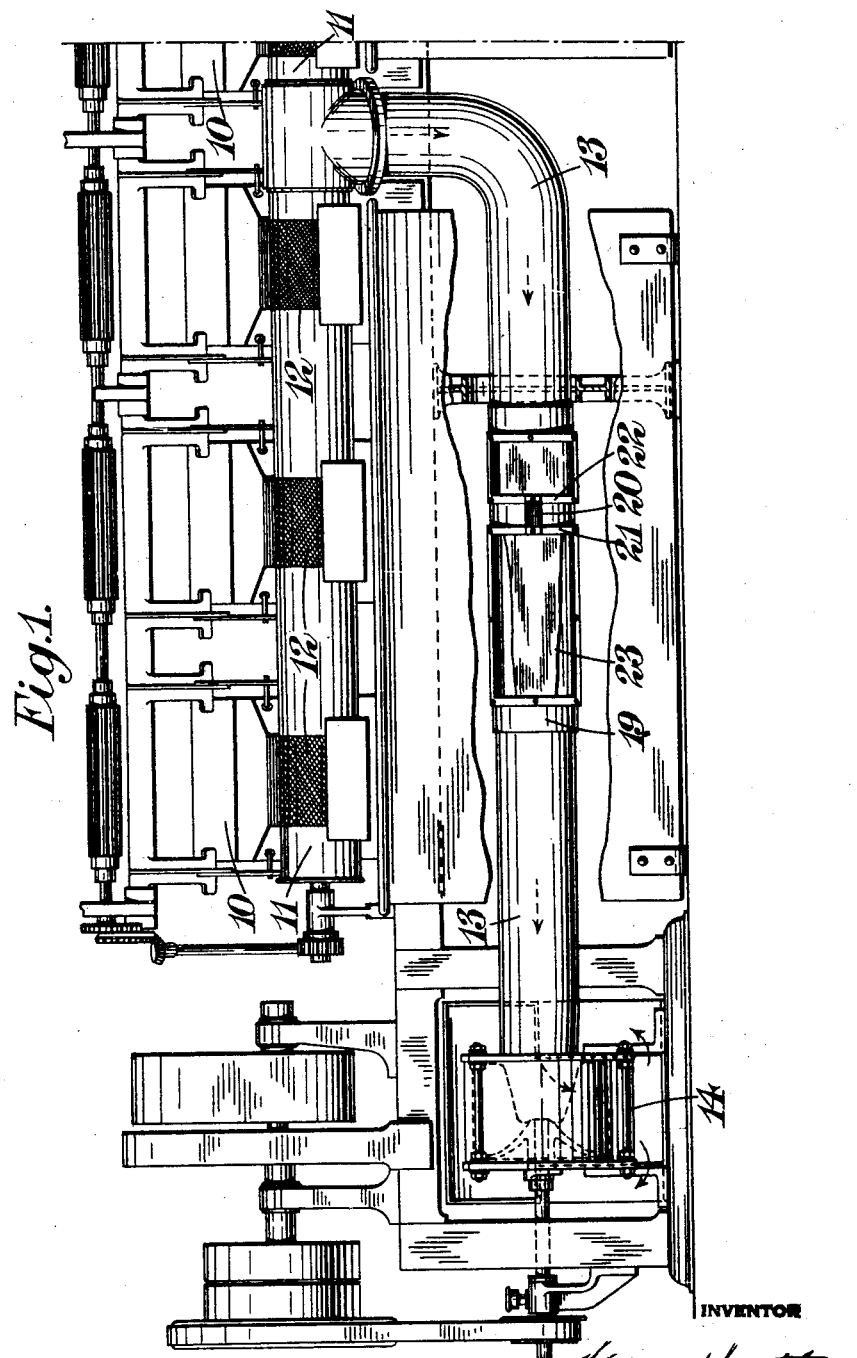

April 17, 1928. 1,666,379
W. HARTLEY
WASTE COLLECTING DEVICE FOR COMBING AND LIKE MACHINES
Filed Jan. 22, 1926  2 Sheets-Sheet 2
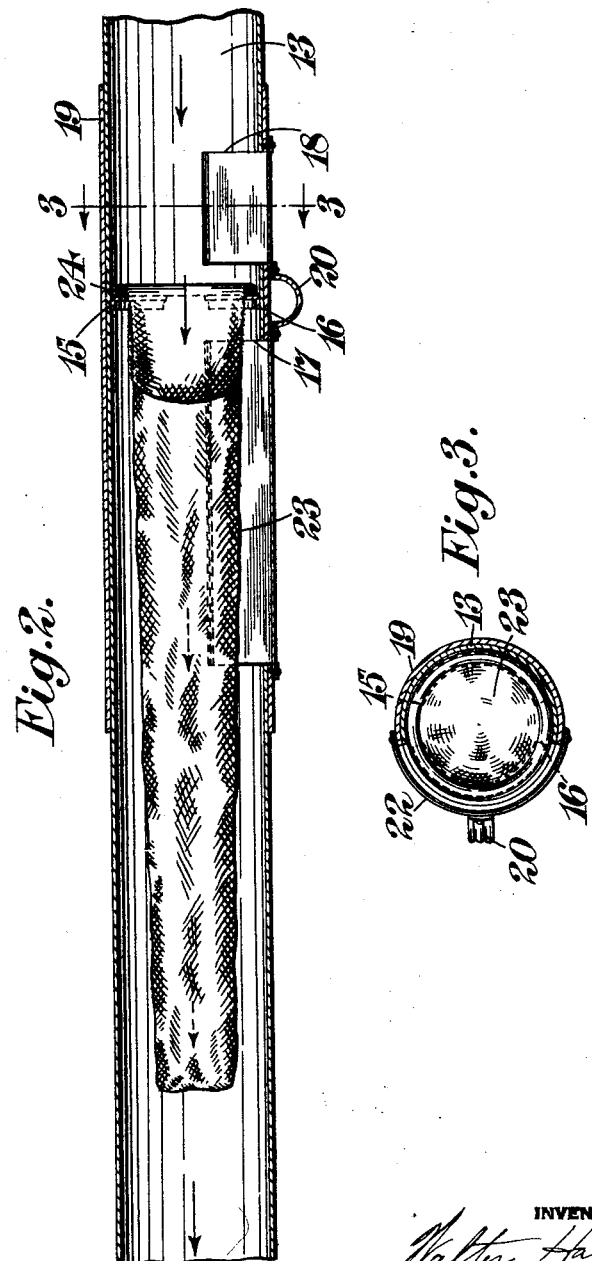

Patented Apr. 17, 1928.

1,666,379

UNITED STATES PATENT OFFICE.

WALTER HARTLEY, OF BOLTON, ENGLAND, ASSIGNOR TO DOBSON & BARLOW LIMITED, OF BOLTON, ENGLAND, A BRITISH COMPANY.

WASTE-COLLECTING DEVICE FOR COMBING AND LIKE MACHINES.

Application filed January 22, 1926, Serial No. 82,992, and in Great Britain May 15, 1925.

This invention is for improvements in or relating to waste-collecting devices for combing and like machines of the type of waste-collecting device in which air suction means are provided for withdrawing the waste from the stripping brushes or like members of the combing or like machine and collecting such waste. In combing machines of the Hubner pattern it has been proposed to collect the waste in a loose state in the interior of a perforated receptacle, while in machines embodying the Roth aspirator, the waste is collected on the surface of a revolving perforated drum through the interior of which the air is exhausted. An advantage of the Roth construction is that the waste can be stripped from the collecting drum in a conveniently consolidated lap or like formation.

Experience shows that with the waste-collecting devices heretofore used there is always a proportion of fluff or small fibres which passes the waste collector. It is usual for the exhaust fan which creates the suction to be arranged to exhaust freely into the room wherein the machines are working and consequently it continuously discharges into the atmosphere the fine fluff which has not been extracted by a waste collector. It will be appreciated that this state of affairs is objectionable and it is an object of the invention to remedy it.

According to the primary feature of the present invention there is provided in combination with a principal waste collector, an auxiliary waste collector which is so connected to the principal waste collector as to have passed through it the fluff-laden air which has already passed through the principal collector and had a proportion of the fluff extracted by the latter. The principal waste collector may conveniently be a revolving perforated drum through the interior of which the air is exhausted, while the auxiliary waste collector may conveniently take the form of a bag of fabric, wire gauze, perforated metal or the like into the mouth of which the stream of fluff-laden air is directed. The employment of such a form of auxiliary collector is preferable since it will not positively interrupt the passage of the air to the suction fan, though, of course, the parts will be so arranged as to ensure that there is no short-circuiting path for the fluff-laden air past the auxiliary collector.

It is preferred to house the auxiliary collector in a conduit leading from the principal collector to the suction generator (for example a fan) and to provide an aperture in the walls of the said conduit for the inspection, manipulation or removal of said auxiliary collector. The interior of the walls of the said conduit may be provided with a stop abutment and the auxiliary collector may take the form of a bag with a stiffened mouth whereof the back of the mouth is drawn against the said stop abutment by the air suction. The bag can thus be arranged to fit closely against the interior of the conduit and ensure that all of the air proceeding to the fan will pass through the bag which will extract and retain the fluff and permit the passage to the fan of air in a sufficiently clean condition to be exhausted into the work room.

For a more complete understanding of the invention there will now be described, by way of example only and with reference to the accompanying drawings, one constructional form of waste collector according to the invention. It is to be understood, however, that the invention is not restricted to the precise constructional details set forth.

In these drawings:—

Figure 1 is a side elevation of a portion of a waste collector according to the invention applied to a combing machine for use in the preparation of cotton.

Figure 2 is a detail sectional plan of certain of the parts shown in Figure 1, showing those parts on a scale larger than that of Figure 1, and Figure 3 is a cross-section on the line 3—3 of Figure 2.

Like reference numerals indicate like parts throughout the drawings.

The combing machine is shown at 10 and a revolving drum at 11 which extends along the combing machine and has perforated portions 12 situated at convenient positions along its length to correspond with the heads of the combing machine. Communicating with the interior of the revolving drum 11 is an air trunk 13 at the end of which a suction fan 14 is provided. This waste-collecting device 11 and 12 is of well known construction. It serves to collect the bulk of the waste from the stripping brushes of the combing machine, but as already mentioned a certain proportion of this waste passes through the perforations at 12 and enters the trunk 13.

In carrying out the present invention there are provided inside the trunk 13 two flanges 15 and 16 which are each of a part-circular form and are arranged opposite to each other with spaces between their ends. Adjacent to the flanges 15 and 16 there are provided apertures 17 and 18 in the wall of the trunk 13 which are covered by a sleeve 19 mounted to slide along the trunk 13 and controlled by a handle 20. The sleeve 19 is shown as being provided with windows 21 and 22 corresponding to the apertures 17 and 18 and in this way the interior of the trunk can be inspected during working, while by sliding the sleeve sufficiently to uncover the apertures, access is possible to the interior of the trunk. To collect the fine particles of waste proceeding along the trunk 13, there is placed inside the latter a bag 23 of long conical formation with a stiffening wire or flange 24 around its mouth. The back of the mouth is intended to bear against the flanges 15 and 16, and it will be appreciated that the bag can be placed in position by passing it through the aperture 17, and turning it edgewise so as to pass it between the ends of the flanges 15 and 16 after which it is turned into the position shown in Figure 2. The suction of the air will tend to maintain the bag in position and in some circumstances it may be found feasible to make the perforations in the bag finer than those at the situations 12 in the drum 11.

It will be appreciated that the bag can be readily examined periodically to ensure that the air passage does not become choked, and moreover the bag can be readily removed when necessary for emptying or cleaning. Any preferred material may be employed in manufacturing the bag and it is to be understood that the invention is not restricted to the precise constructional details set forth.

I claim:—

1. In a waste-collecting device of the type described, the combination with a principal waste collector, of a pipe leading therefrom, a stop abutment in the interior of said pipe, an auxiliary waste-collecting bag with a stiffened mouth located in said pipe in such a way that the mouth is directed towards the principal waste collector and the back of the mouth lies against the stop abutment, and means for applying suction to the pipe to draw the stream of fluff-laden air from the principal collector through the bag and thereby draw the back of the mouth of the bag against the stop abutment.

2. In a waste-collecting device of the type described, the combination with a principal waste collector, of a pipe leading therefrom, a stop abutment in the interior of said pipe, an auxiliary waste-collecting bag with a stiffened mouth located in said pipe in such a way that the mouth is directed towards the principal waste collector and the back of the mouth lies against the stop abutment, the said pipe being formed with an aperture adjacent to the stop abutment for the manipulation or removal of the said bag, a movable cover for said aperture, and means for applying suction to the pipe to draw the stream of fluff-laden air from the principal collector through the bag and thereby draw the back of the mouth of the bag against the stop abutment.

3. In a waste-collecting device of the type described, the combination with a principal waste collector, of a pipe leading therefrom, a stop abutment in the interior of said pipe, which abutment extends only part of the way round the inner walls of the pipe and leaves diametrically opposed gaps, an auxiliary waste-collecting bag with a stiffened mouth located in said pipe in such a way that the mouth is directed towards the principal waste collector and the back of the mouth lies against the stop abutment, the dimensions of the mouth being such as to permit the bag to be passed edgewise into position through the aforesaid gaps in the abutment, the said pipe being formed with an aperture at the rear of the stop abutment for the manipulation or removal of the said bag, and with an inspection window towards the front of the abutment, a sleeve movable along the pipe to cover the aperture, and means for applying suction to the pipe to draw the stream of fluff-laden air through the principal collector to the bag and thereby draw the back of the mouth of the bag against the stop abutment.

4. In an air suction waste-collecting device the combination of an air duct connected to the suction generator, a waste-collector in the air duct, a stop abutment on the inner wall of the duct and an abutment on the collector adapted to be drawn and held by the air suction against the stop abutment on the duct.

5. In an air suction waste-collecting device the combination of an air duct connected to the suction generator, a waste-collector in the air duct, a stop abutment on the inner wall of the duct and a circular flange carried by the waste-collector which makes contact with the stop abutment on the duct when the waste-collector is held in position by the suction of the generator.

6. In an air suction waste-collecting device the combination of an air duct connected to the suction generator, a waste-collector in the air duct, a flange carried by and projecting radially inwardly in the duct and a stop abutment carried by the waste-collector which makes contact with the flange carried by the duct when the waste-collector is held in position by the suction of the generator.

7. In an air suction waste-collecting device the combination of an air duct connected to the suction generator, a waste-collector in the air duct, a flange carried by and projecting radially inwardly in the duct and a flange carried by the waste-collector which makes contact with the flange carried by the duct when the waste-collector is held in position by the suction of the generator.

8. In an air suction waste-collecting device, an air duct connected to the suction generator, a flange on the duct having diametrical gaps, and a waste-collector having a mouth of such dimensions that it can be passed edgewise through the gaps but when turned through a right angle will be retained by the flange.

9. In an air suction waste-collecting device an air duct a waste-collector therein, and a flange inside the air duct to position the waste-collector, said duct having an aperture at the rear of the flange through which the hands of the operator may be passed to facilitate the positioning of the waste-collector.

10. In an air suction waste-collecting device an air duct, a waste-collector therein, a flange inside the air duct to position the waste-collector, said duct having an aperture at the rear of the flange through which the hands of the operator may be passed to facilitate the positioning of the waste-collector and a cover for the aperture which can be slid along the duct to open or close the aperture.

In testimony whereof I affix my signature.

WALTER HARTLEY.